(12) United States Patent
Lindner

(10) Patent No.: US 9,141,980 B2
(45) Date of Patent: Sep. 22, 2015

(54) METHOD AND APPARATUS FOR OFFERING DIGITAL CONTENT FOR SALE OVER A COMMUNICATIONS NETWORK

(75) Inventor: Stephan Lindner, Loewenberg (DE)

(73) Assignee: Accenture Global Services Limited, Dubin (IE)

( * ) Notice: Subject to any disclaimer, the term of this patent is extended or adjusted under 35 U.S.C. 154(b) by 1611 days.

(21) Appl. No.: 10/275,193

(22) PCT Filed: Jul. 16, 2001

(86) PCT No.: PCT/EP01/08201
§ 371 (c)(1),
(2), (4) Date: Oct. 31, 2002

(87) PCT Pub. No.: WO02/07019
PCT Pub. Date: Jan. 24, 2002

(65) Prior Publication Data
US 2003/0120549 A1  Jun. 26, 2003

(30) Foreign Application Priority Data
Jul. 17, 2000 (DE) ................................. 100 34 734

(51) Int. Cl.
*G06Q 30/00* (2012.01)
*G06Q 30/06* (2012.01)
*G06Q 20/20* (2012.01)

(52) U.S. Cl.
CPC .............. *G06Q 30/06* (2013.01); *G06Q 20/204* (2013.01); *G06Q 30/0605* (2013.01); *G06Q 30/0641* (2013.01)

(58) Field of Classification Search
USPC .......................................... 705/26, 21, 26.1
See application file for complete search history.

(56) References Cited

U.S. PATENT DOCUMENTS

| | | | | |
|---|---|---|---|---|
| 5,835,911 A * | 11/1998 | Nakagawa et al. | ........... | 709/203 |
| 5,870,473 A | 2/1999 | Boesch et al. | | |
| 5,918,215 A * | 6/1999 | Yoshioka et al. | ............... | 705/30 |
| 6,081,835 A | 6/2000 | Antcliff et al. | | |
| 6,092,053 A | 7/2000 | Boesch et al. | | |
| 6,175,823 B1 * | 1/2001 | Van Dusen | ...................... | 705/26 |
| 6,519,571 B1 * | 2/2003 | Guheen et al. | .................. | 705/14 |
| 6,898,577 B1 * | 5/2005 | Johnson | .......................... | 705/51 |
| 7,197,475 B1 * | 3/2007 | Lorenzen et al. | ............... | 705/26 |
| 2001/0014884 A1 * | 8/2001 | Dillard et al. | .................... | 705/57 |
| 2002/0073033 A1 * | 6/2002 | Sherr et al. | ..................... | 705/51 |
| 2003/0041094 A1 * | 2/2003 | Lara et al. | ..................... | 709/201 |
| 2003/0135464 A1 * | 7/2003 | Mourad et al. | .................. | 705/50 |

OTHER PUBLICATIONS

Sell and buy digital content with SalesMate, Accenture, Business Facts flyer, printed Aug. 20, 2001, 2pgs.
Paper by S. Lindner, "SalesMate, How the idea was born", signed Oct. 25, 2002 in Germany, 4 pgs.

* cited by examiner

*Primary Examiner* — Ramsey Refai
(74) *Attorney, Agent, or Firm* — Brinks Gilson & Lione

(57) ABSTRACT

Content in digital form like pictures, music files, videos, software etc. from a plurality of content providers (110) is sold to a plurality of users (130) over a communication network like the internet. The content provider submits to a service provider (100) information about the content to be sold and the service provider provides controlled user access to the content for sale under the conditions defined by the information submitted by the content provider. Purchase data about sold items are stored and the user authentification and payment process for all content providers is carried out centrally through a payment system (120) thus offering low transaction costs.

40 Claims, 7 Drawing Sheets

| Catalogue | | | Content Files | | | | |
|---|---|---|---|---|---|---|---|
| | Directory | File Name | | Directory | File Name | Comment | Duration | Price |
| 1. | ftp.CP1.de/ | picture index | | CP1/pictures | picture A | ...... | 12hrs. | € 10,00 |
| 2. | # as ..... # | pictureindex.htm | | CP1/pictures | picture B | ...... | 30min. | € 5,00 |
| 3. | | | | | | | | |
| 4. | | | | | | | | |

Fig. 4

METHOD AND APPARATUS FOR OFFERING DIGITAL CONTENT FOR SALE OVER A COMMUNICATIONS NETWORK

CROSS REFERENCE TO RELATED APPLICATIONS

This application claims the benefit of the German patent application DE 10034734.7, filed on Jul. 17, 2000, titled "Web-basierte, automatisierte Schnitt-stelle zwischen Informationsanbietern and einem Electronic Payment Provider".

FIELD OF THE INVENTION

The present invention relates to a method and apparatus for offering digital content like pictures, music files, software programs, technical information or contact addresses for sale over a communication network, in particular the internet.

DESCRIPTION OF RELATED ART

The internet is an ideal medium for offering digital content like music, digitized pictures, news like sports results or share prices etc. to a large number of potential customers. A very frequently, used way to "pay" for content on the web is the use of advertising banners. This source of revenue, however, is in the most cases restricted to rather large content providers.

Another possibility to charge for content provided over the internet are electronic payment systems (ePS) which handle the payment of small amounts of money by aggregating small payments over a time first (so-called micro-payments) with contract partners like Credit Card companies. For this purpose the software of the electronic payment system like Qpass™ or Cybercash™ has to be integrated into the web site of the content provider. This requires a lot of configuration and programming work and is therefore expensive. For this reason small content providers like small companies or private persons cannot afford to offer their content for sale on the internet.

SUMMARY OF THE INVENTION

An implementation of the present invention provides a method of offering content for sale over a communications network, comprising: receiving from a plurality of registered content providers sales information about content which the content provider intends to offer for sale, providing, through a web hosting service provider and an electronic Payment System, controlled user access to the content for sale over the communications network under conditions defined by the sales information from the content provider, detecting, customizing and storing content provider specific data about the content for sale to a user, and processing payment received from the ePS for the user purchases for the plurality of content providers.

The processing of payments for sold content for a plurality of content providers is carried out by the web-hosting service provider together with a suitable electronic payment system (Micropayment). The distribution of the earnings to the respective content providers is then performed in regular time intervals, for example once a month. Usage of Micropayment allows for payment processing to substantially reduce the costs of an online transaction for small content providers, while the usage of the present invention will further reduce costs by avoiding programming skills and therefore costs. This combination will allow small content providers to enter the market Moreover, the present invention provides a content provider with the possibility to offer its content for sale on the internet without requiring programming work. After registration the content provider only needs to enter some information about the content through an electronic information input form or the like and within a short time can sell its content over the internet.

The method according to the present invention may comprise a content provider registration process including assigning the content provider a user name and password. Using this user name and password the update of content or provision of new content can then be performed ensuring complete privacy of the information entered to enable the sales process.

The method according to the present invention preferably comprises a content designation procedure for designating the content for sale on the internet and including scanning a web site of the content provider, displaying content files found during scanning, and selecting the content files for sale. With this content designation process the selection of files for online sale can be accomplished very easily based on a display of the files of the web site of the content provider which could be sold on the internet.

Sales information like a time period where the digital content can be retrieved by the customer or the sales price may be entered interactively to a user interface. Additional comments like short descriptions of the items on sale may be added.

The content designation process preferably includes selecting different file types for sale, selecting directories where content for sale is stored and selecting a catalogue file with references to the content what will be setup for sale.

The sales information may alternatively be input as a text document or as a table to allow an experienced user more convenience.

The present invention preferably comprises a content setup procedure including moving a designated content file on a web site of the content provider to a protected area, where only the electronic Payment System can provide access to and replacing the original content files of the content provider by "dummy" files having a link to the electronic Payment System's payment authorization web-page and including sales information provided by the content provider. The protected area is only accessible by authentified users which have for example entered payment information like a credit card number. The dummy files make it easy to restore the original state of the web site of the content provider after termination of the registration.

Preferably an automatic content update process is provided replacing content files in the protected area by the corresponding files from the content provider if the latter has a younger time stamp. A content update can therefore be performed automatically without the need of interaction by the content provider. This also allows to move an empty content file to the protected area and replace the same by the complete file including the content if the same is available.

A further implementation of the present invention provides a computer system for offering content for sale over a computer network comprising a content provider interface for receiving from a plurality of registered content providers sales information about a content which the content providers intend to offer for sale, a storage unit for storing the received content for sale, a user interface, for providing, through an electronic payment system controlled user access to the stored content for sale over the communications network under conditions defined by the sales information from the consent provider, a further storage unit for storing purchase data about content purchased by a user, and a processing unit for distributing the sales revenues among the plurality of content providers based on the purchase data.

The present invention still further provides a computer program product comprising executable code for receiving from a plurality of registered content providers sales information about content which the content providers intend to offer for sale, providing, through a service provider and an electronic payment system, controlled user access to the content for sale over the communications network under conditions defined by the sales information from the content provider, detecting and storing purchase data about content purchased by a user, and distributing sales revenues among the plurality of content providers based on the purchase data.

Further embodiments of the present invention are described by the dependent claims.

The present invention and further objects, features, and advantages thereof will become more readily apparent from the following detailed description of particular embodiments taken in connection with the attached drawings.

BRIEF DESCRIPTION OF THE DRAWINGS

FIG. 4 is a schematic illustration of a screen display of an information input form for inputting content sales information.

DETAILED DESCRIPTION OF PREFERRED EMBODIMENTS

In the following some expressions used in the specification are defined:

Content provider: provider of digital content like picture or music files, news, technical information or software. The content is stored on a website of the content provider. The present invention is particularly useful for smaller content providers like small businesses or private persons.

Service provider: provider of services like e-commerce services over the internet for others, often called virtual domain hosting service provider or simply web hosting service provider. The web sites of a plurality of content providers are accessible by users over the internet through the web site of the service provider.

Electronic payment system: a software providing secure payment, also of small amounts of money, over the internet. Examples are Qpass™, Cypercash™, Firstgate™, Paypal™, Millicent™ etc. For authentification of a user either username & password or a public key infrastructure may be used.

User: any person surfing in the internet with a suitable device like a PC, laptop or web-enabled mobile phone.

Customer: content provider who is registered with the service provider using the present invention to offer content for sale over the internet.

Figure 1:
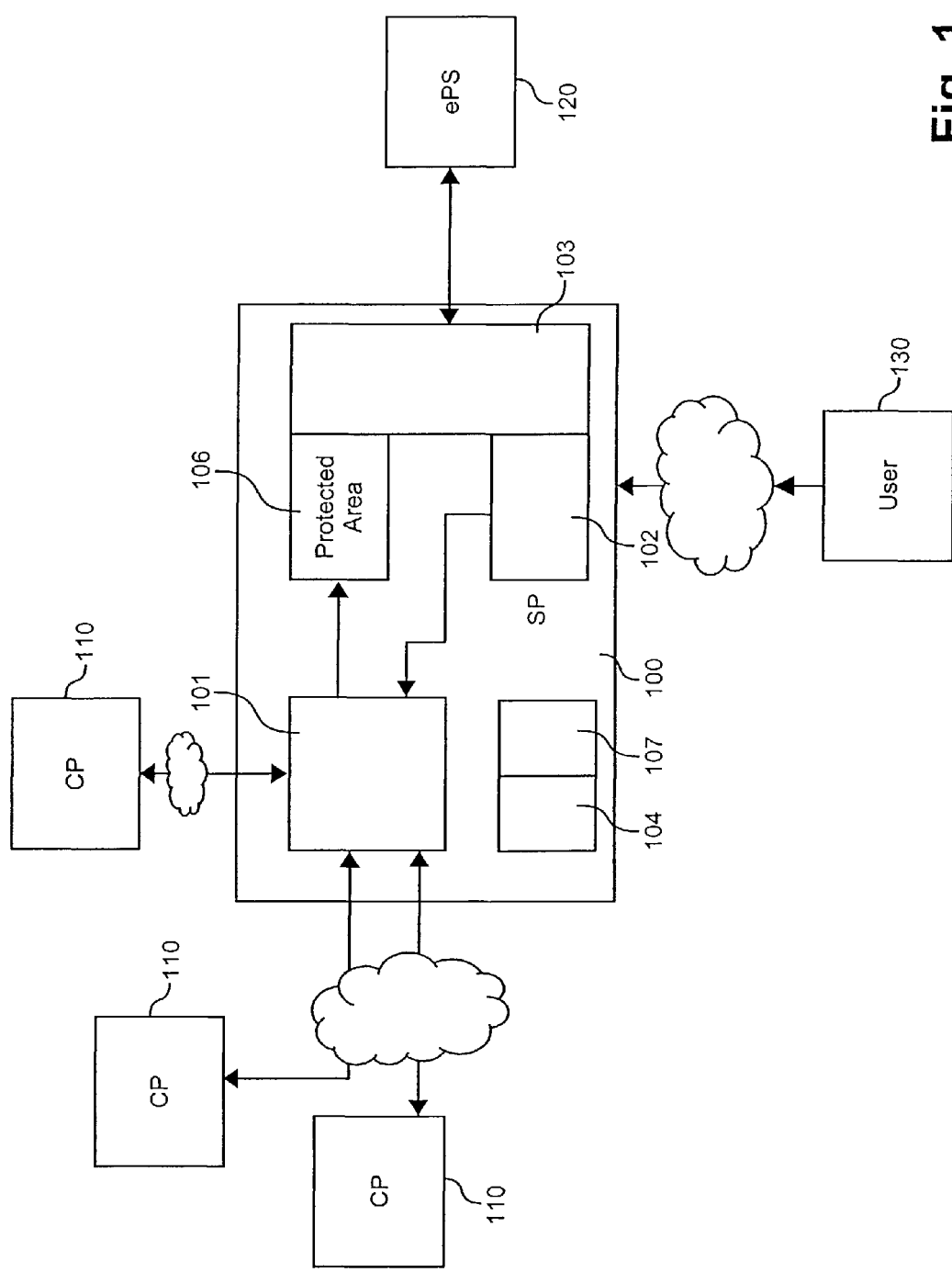
FIG. 1 is a schematic illustration of a computer system according to the present invention.

FIG. 1 is a schematic illustration of an embodiment of the present invention. A service provider (SP) 100 can be accessed by a plurality of users 130 over a communications network like the internet. On the web site of the service provider 100 digital content of a plurality of content providers 110 is offered for sale to the users. Among the content providers (CP) there may be small publishers of music, shareware, books or news, dating agencies, vendors of expert information like addresses, technical, medical or legal information or lifestyle information like the "hippest" bars, restaurants or live events. The content providers 110 register with the service provider 100 to offer designated digital content for sale over the internet. The payment processing for all content sold through service provider 100 is carried out through an electronic payment system 120. After user authentification through user interface 102 (e.g. by entering a password or a credit card number) the payment processing for the sale of a content item from one of the content providers to a user is carried out by the service provider through payment interface 103. For the payment system 120 only one customer exists, i.e. the service provider 100. The service provider having the functions of the present invention thus acts as an aggregator for payment services between content providers and users. It so enables the customers to sell their content with very low basic fees. The service provider becomes a "mall" where content providers rent spaces on the service provider web site to sell their (information) goods having a single "cashier" at the exit. The web hosting service provider receives from a user account at the electronic payment system money for selling its aggregated content which is then distributed (after subtracting a commission) among the plurality of content providers related to their respective turnovers. The number of content providers may be many hundred or many thousand or even more. Furthermore each registered content provider is enabled as member of the electronic payment system thus receiving user name and password for the server therefore creating potential new customers.

The computer program according to the present invention may be embodied as a server application running on the web hosting service provider system 100. The invention, however, may also be implemented as a distributed application running on a plurality of connected server systems. The program comprises a first content provider interface 101 to a plurality of content providers 110, a second interface 102 (user interface) enabling access to an electronic payment system controlling user access to the content for sale and a third interface 103 (payment interface) to an electronic payment system 120 which controls access to the content in a protected area (106) and will also be used to receive the data about the revenues from the ePS generated by the content sales that will have to be distributed to the content providers. Moreover, a storing unit 104 is provided for storing purchase data i.e. data about which user purchases which content at what price. Furthermore, a processing unit 107 provides an automatic update procedure as described in FIG. 7 Based on this data the revenues (minus the commission) are distributed among the content providers.

A content provider, after being registered as customer of the web hosting service provider receives through first interface 101 an offer to use the service provider for enabling its web site for electronic commerce. The content provider only needs to enter some information about the content offered for sale, input a confirmation and is shortly thereafter fully e-commerce enabled. No manual changes or programming work of the web pages or CGI scripts of the content provider is required. All necessary steps for designating and setting up the content for sale are carried out in an automated way as will be described later with reference to FIGS. 3 to 5.

Figure 2:
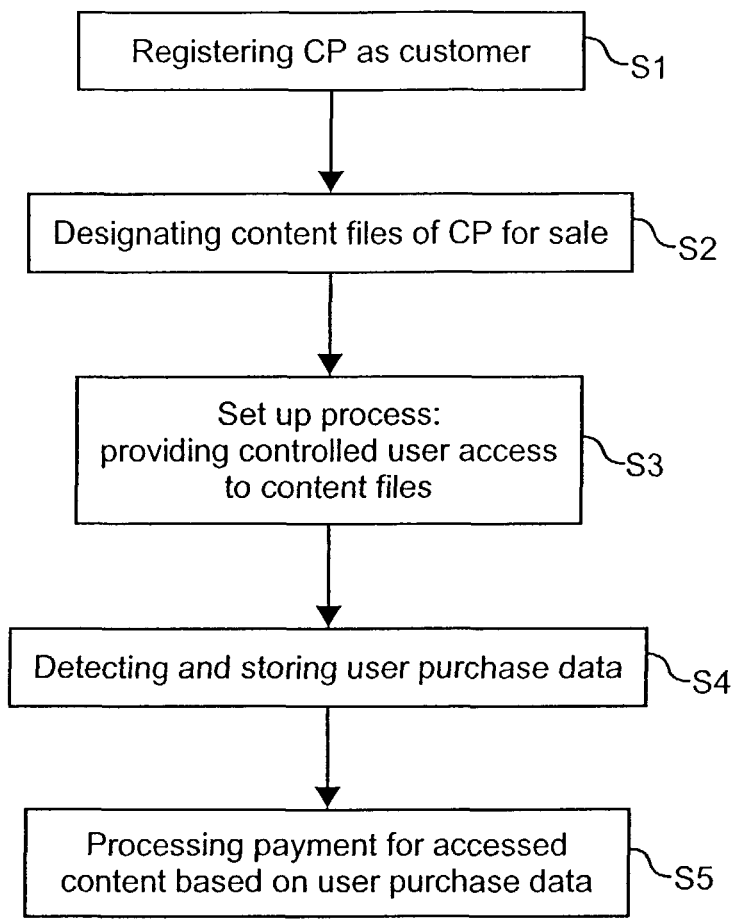
FIG. 2 is a flow chart illustrating the method steps of an embodiment of the present invention.

FIG. 2 is a flow chart illustrating the process steps of a particular embodiment of the present invention.

With the registration procedure S1 a content provider becomes customer of the web, hosting service provider. The registration procedure includes inputting data about the address, bank account and type of business of the content provider. If the CP agrees to the hosting conditions he receives a user name and password at the end of the registration process identifying the content provider as specific customer and allowing a later submission and update of content using user name and password.

Figure 3:
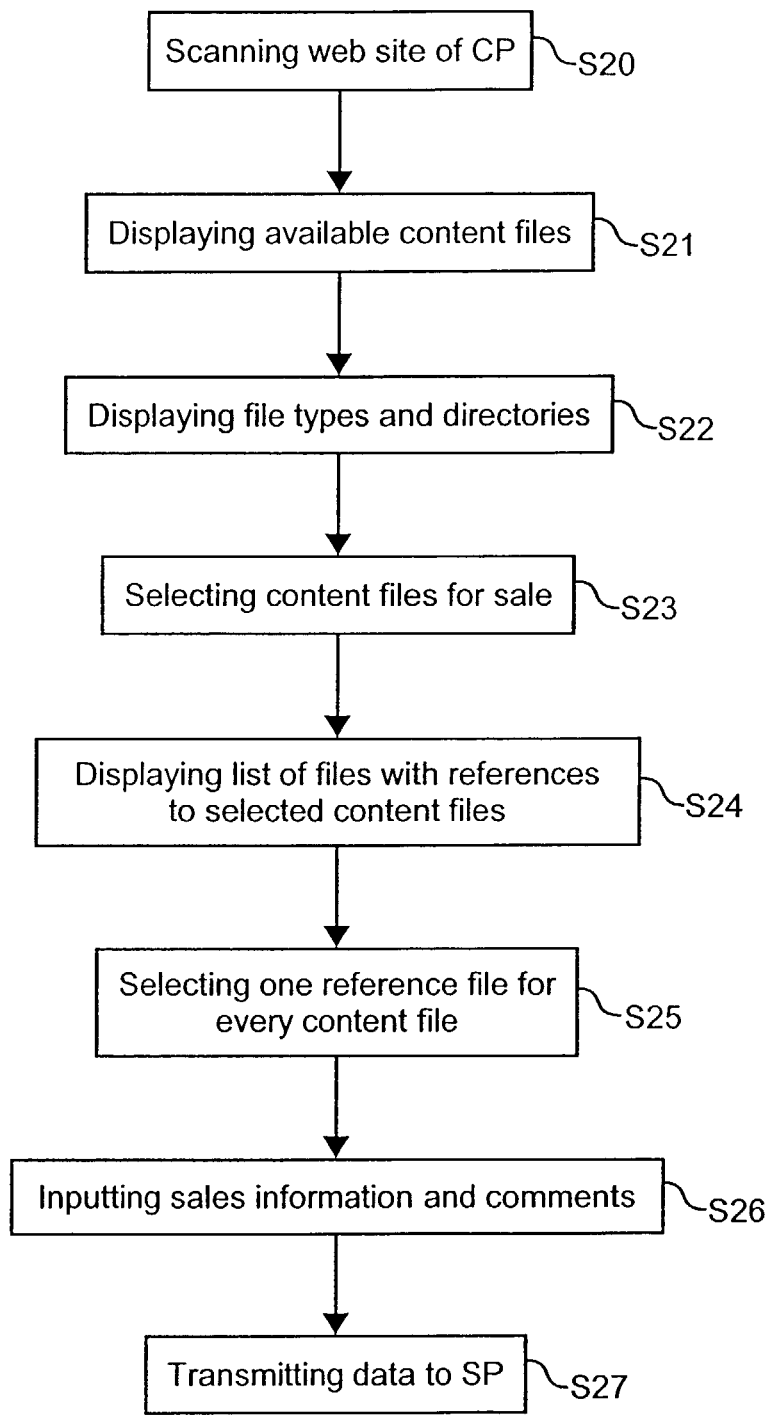
FIG. 3 is a flow chart illustrating the method steps of an embodiment of the content designation process according to the present invention.

Then the content files which the registered content provider wishes to offer for sale are determined by the content designation procedure S2 which will be in detail explained later with reference to FIG. 3.

Then follows the setup process S3 in which the designated content files are set up for controlled user access, that is access in exchange for payment.

For every purchase of an item made through the web hosting service provider the purchase data including identification of the sold item and the buyer (log-file) are detected and stored in process step S4. The log file may also be produced by the electronic payment system. Based on the user purchase data the payment is processed and the revenues distributed among the content providers (process step S5).

The content designation procedure will now be explained with reference to FIG. 3. In this procedure the content provider defines which content from his web site should be for sale.

In the first step S20 the web site of the content provider is scanned and in subsequent step S21 all available files which could potentially be sold over the web are listed on a display screen. The content provider may filter out files (e.g. private content) he does not wish to be displayed. From the displayed files the content provider can select via a check box or the like the files he wishes to sell. For picture sales a thumbnail of for example 120×120 pixel and for text files a teaser of 128 bytes may be generated to support the decision which content to select. For all files it is preferred to display the file name, size and date.

In subsequent step S22 file types and directories of the CP web site are detected and displayed.

After the content provider has selected a number of files for sale in step S23 the system will then scan all HTML files of the web site of the content provider for all the file names the user has selected. A list of all these HTML files where reference to the selected content files are made is then displayed on a display medium (step S24). From this list of files the content provider then selects exactly one reference file with reference to the content file he wishes to sell (step S25).

In subsequent method step S26 the sales information relating to the content is inserted by the content provider. This information includes:

The catalogue file path and file name with a link to the content file for sale. This file can only be a .htm or .html file. It needs to contain the file name of the content file physically (i.e. not constructed by e.g. Java script). The content provider can specify if he does not wish an automated update of the catalogue file, e.g. in case it contains Java script.

The content file path and file name. This file can be of any file type. The content file does not yet need to exist and can be added later.

A description or comment, either plain text or a mixture of plain text and basic HTML.

The duration of a temporary link to the content file, i.e. the time duration how long a content file shall be available after it has been sold. The duration may be selected interactively within minimum and maximum values.

The price for a single purchase of the content.

An example of a screen display for interactively inputting the sales information is shown in FIG. 4.

For every content item a separate row is provided. On the left-hand side the catalogue file path (catalogue directory) and the catalogue file name are input. On the right-hand side the content file path and content file name are entered together with comment text (in the case of pictures thumbnails are also possible), the sales duration and the sales price.

Alternative to the interactive input of the sales data these may be transferred to the service provider as text files. In this case, however, strict formatting rules have to be obeyed.

The invention allows an automated procedure for designating the content files for sale and submitting the necessary sales information to the web hosting service provider. No programming work is required.

Figure 5:
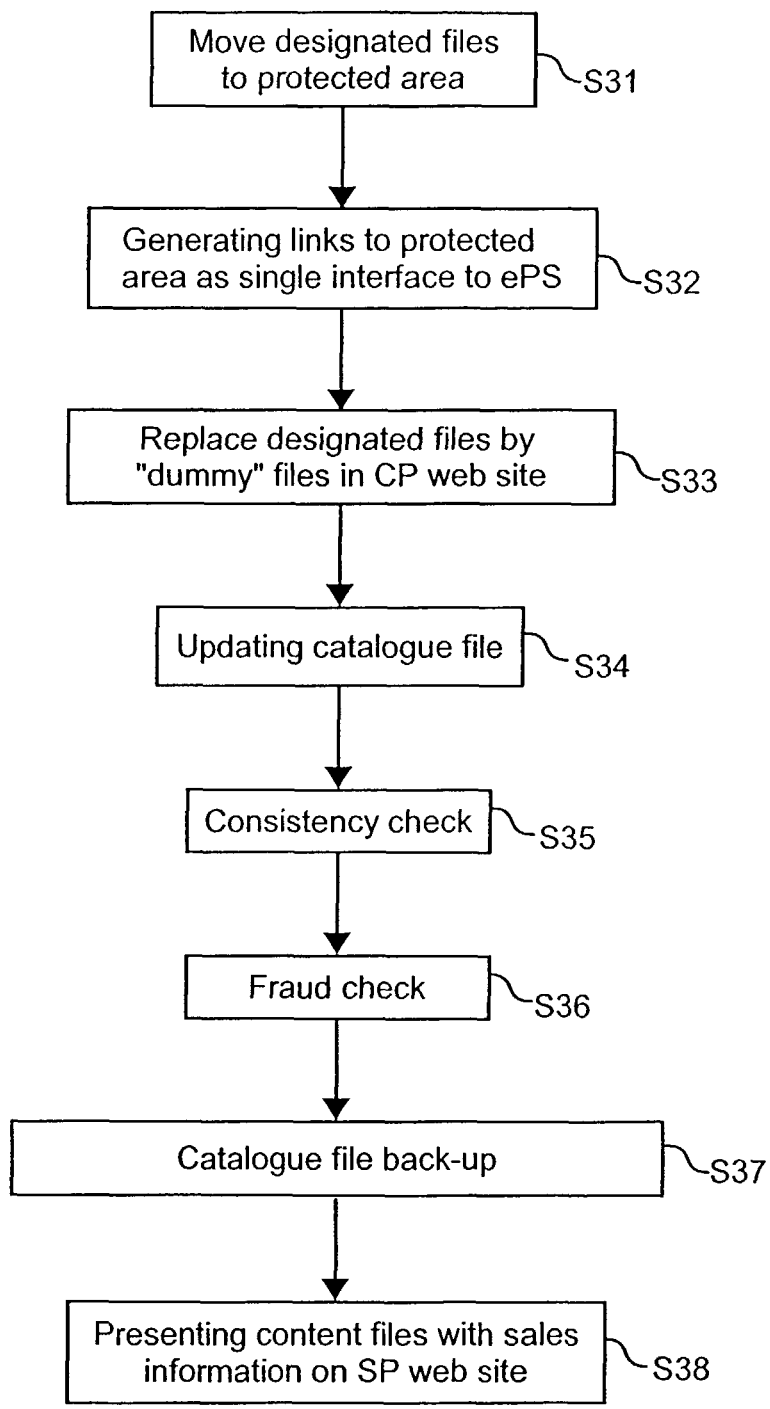
FIG. 5 is a flow chart illustrating an embodiment of a content setup process according to the present invention.

FIG. 5 illustrates the content setup process which is an automated process making the designated content files of a content provider available for sale over the interne.

In step S31 the designated files are moved to a protected area to which only the service provider has read and write access and a user via the electronic payment system has read access to. The payment system now analyzes the directory of designated content files and generates a list of links which are returned to the service provider acting as a single interface to the electronic payment system (step S32).

Then, in method step S33, HTML pages called "dummies" are created and stored in the original directory of the content provider. These dummy files are replacing the content files which have been moved to the protected area 106 (FIG. 1). The dummy files always have the same extension.html or htm and may have the same file names as the original content files facilitating an automated update procedure (will be explained later). The dummy files are located at the places of the original files and are accessible for the user over the interne.

The catalogue file corresponding to the content file has to be updated if there are files referenced in it which do not end with ".htm". This means that an update is necessary since upon moving a content files to the protected area the file extensions are changed from .jpg, .gif, .mp3, .wav etc. to .htm.

The dummy files act as carrier for the chargeable link to the content provided by the payment system.

To prevent obvious error sources it is checked in step S35 if changes in the catalogue files will lead to inconsistencies. This is done by checking for each of the content file names if there are files with the same name but different extensions in the same directory, e.g. if there is a file "picture.htm" and a file "picture.jpg" referenced in the catalogue file. Detecting such an inconsistency will stop the action and generate an error report. It is further checked if there are files in the directories of the content provider which have to be overwritten with the dummy files. This will also stop further action and generate an error report.

To prevent fraud it is checked in method step S36 if there are files exceeding a critical file size which have to be changed or moved (e.g. larger than 2 GB). This will stop further action and generate an error report.

To allow an easy and secure role-back back-up files of all catalogue files are created in step S37.

Finally, in step S38, the content files are presented on the web site of the service provider together with the sales information like sales duration or sales price.

Figure 6:
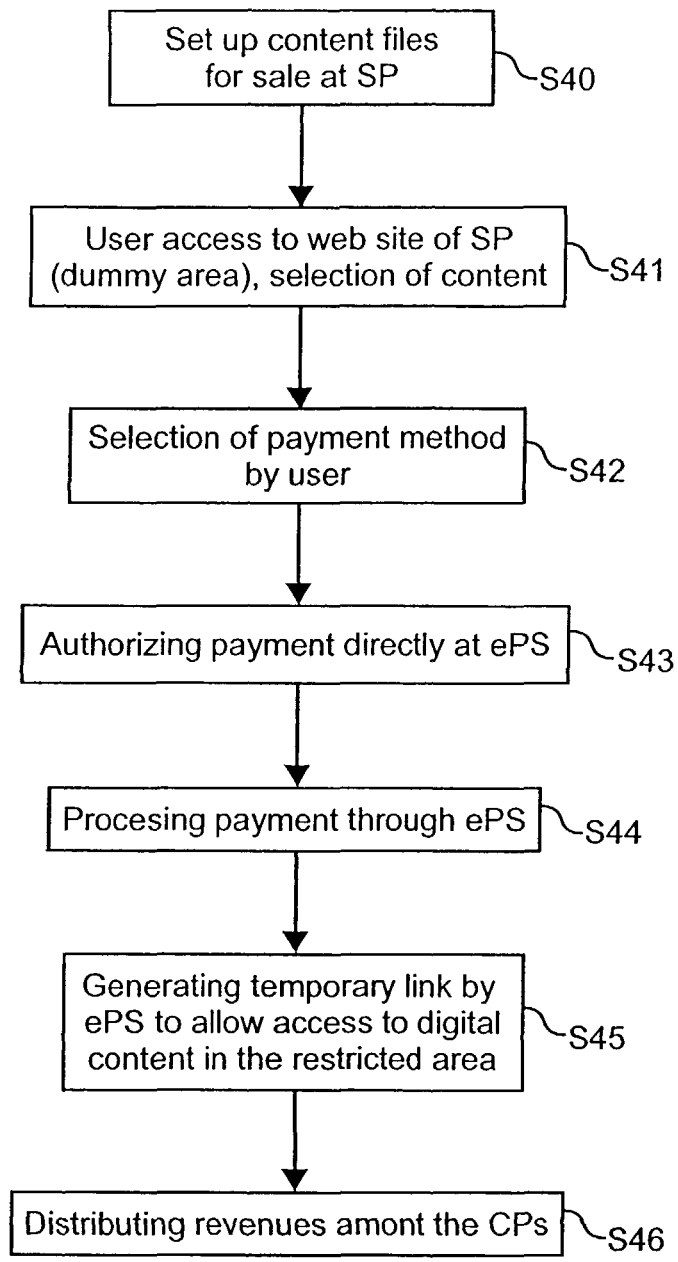
FIG. 6 is a flow chart illustrating the sales process according to an embodiment of the present invention.

The flow chart of FIG. 6 explains the procedure of selling content to a user.

After setting up the content files for sale in step S40 (explained in detail with reference to FIG. 5), a user accesses the web site of the service provider in step S41.

The user selects an offer from a CP in step S41 and decides to purchase the digital content. By selecting the appropriate link in a catalogue file, he comes to the dummy area 105 (FIG. 1). In the dummy area, he selects the payment method he would like to use (step S42). This can be any kind of ePS or Micropayment system (Qpass, Firstgate, Cybercash etc.) the service provider is able to offer for payment.

Directly on the dummy page, the user enters his username and password to authorize the payment of the price given on the dummy page for the digital content (step S43). In case he is not yet signed up for any of the ePS offered, he has to sign-up first and can then return.

In the next step S44 the ePS is processing the payment.

In exchange for the payment authorization, the user then receives in step S45 a temporary link to the digital content in the restricted area, directly from the ePS or Micropayment system. For this purpose the ePS has administration rights over the restricted area at the SP. Due to this the user can access the desired content files in the protected area 106 (FIG. 1) of the content provider through the links from the service provider enabled through the interface between service provider and payment system.

The ePS sends the revenues generated by the digital content sale to the SP, after diminishing a commission (step S46). The service provider uses the invention (FIG. 1, processing unit 107) to distribute the payment to the appropriate content provider. Using the purchase data the service provider then distributes the earnings among the content providers in regular time intervals, e.g. once a month. Since the payment transaction is only carried out between the payment system and the service provider and not between the payment system and many hundred or thousand content providers, the costs for every single transaction can be reduced dramatically. This creates e-commerce opportunities for small and medium-sized content providers.

In addition to the money for the sold content the service provider also reports detailed sales statistics to the content providers which can then adapt its offerings accordingly.

Figure 7:
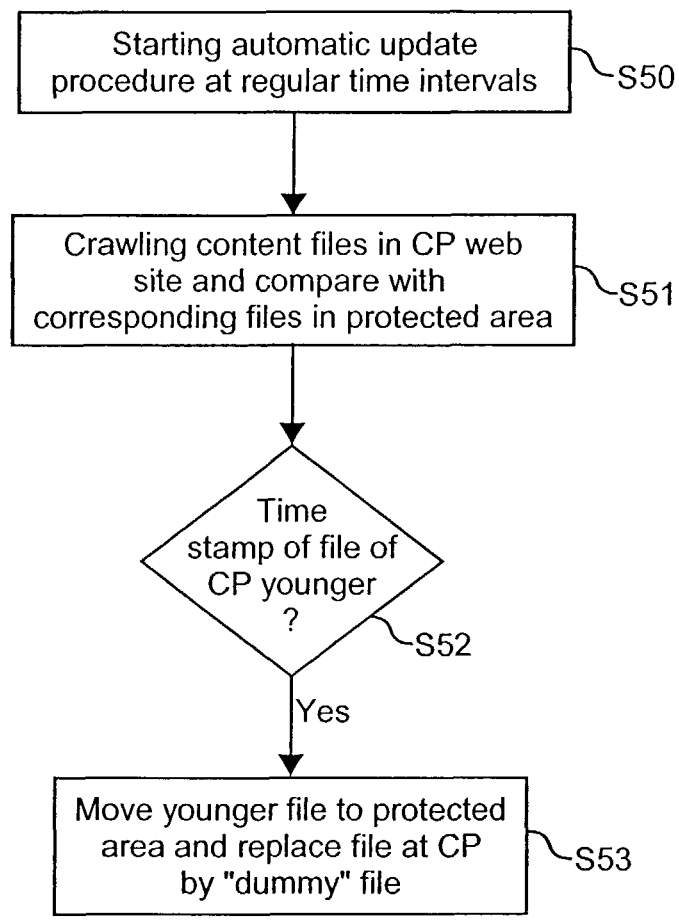
FIG. 7 is a flow chart illustrating an automatic content update procedure according to an embodiment of the present invention.

An automatic update procedure is now explained with reference to the flow chart of FIG. 7.

At regular time intervals, for example every 30 minutes, the system crawls designated content files on the web site of the content provider (step S51). If a file is available its time stamp is compared with the time stamp of the content file last processed (moved). In case the time stamp is different (step S52) the file will be moved from the unprotected CP directory to the protected area and thereby updated, overwriting the older content. In case the sales information (price, duration, description) has changed, the content provider may indicate this by setting an update flag. This causes the system to generate and place an updated dummy file.

It is even possible to create files in the protected area for content that does not yet exist in order to provide the same later when it becomes available. The system generates in such cases a warning "file not found, expecting later arrival during a content setup procedure". In the next update cycle the system then generates the required entries. Only catalogue file links for existing content, however, will be changed.

The automatic update procedure is very convenient for the content provider since it is basically invisible and does not disturb the normal workflow of the content provider.

In the case catalogue or content files are destroyed due to an unforeseeable error or the content provider wishes to terminate the registration with the service provider a rollback procedure may be provided. This procedure sets back the web site of the content provider in the same state as it would be without registration with the service provider. The content files can be reached directly from the catalogue files without a payment system being involved. The last catalogue file backup is moved back into its original directory. All original content files are moved back from the protected area into the original directory overwriting the dummy files.

The invention claimed is:

1. A method comprising:
   accessing content from a first computer system, wherein said first computer system is associated with a content provider;
   storing said content in a memory of a second computer system, wherein said second computer system is associated with a service provider;
   displaying, using said second computer system, a first graphical user interface for enabling a user to select said content for purchase;
   scanning said first computer system for updated content at regular intervals:
      determining updated content by comparing a timestamp of a file of said content in said first computer system to a timestamp of a content file most recently moved from said first computer system to said second computer system;
      overwriting said content stored in said memory of said second computer system when said updated content is determined; and
      replacing said updated content in the first computer system with a dummy file, said dummy file having a file name that is the same as a file name of said updated content.

2. The method of claim 1, wherein said storing further comprises storing said content in a protected area of said memory.

3. The method of claim 1 further comprising:
   changing a file extension associated with said content.

4. The method of claim 1 further comprising:
   providing a file to said first computer system, wherein said file includes a link to said content in said memory of said second computer system.

5. The method of claim 1, wherein said content is selected from a group consisting of at least one image, at least one music file, software, at least one moving picture, text information, technical advice, at least one address, medical information, legal information, and lifestyle information.

6. The method of claim 1 further comprising:
   assigning authentication information to said content provider to enable transfer of said content from said first computer system to said second computer system.

7. The method of claim 1 further comprising:
   analyzing a website associated with said content provider to automatically identify a plurality of content files, wherein said plurality of content files includes said content.

8. The method of claim 7 further comprising:
   displaying a listing of said plurality of content files using a second graphical user interface, and
   wherein said accessing said content further comprises accessing said content responsive to a selection of said content by said content provider using said second graphical user interface.

9. The method of claim 1 further comprising:
accessing information associated with said content from said content provider, wherein said information is selected from a group consisting of a price of said content, a time period associated with a sale of said content, and a description of said content.

10. The method of claim 9, wherein said information is selected from a group consisting of data entered into a graphical user interface, a table, and a text document.

11. The method of claim 1 further comprising:
storing data associated with said purchase of said content; and
distributing revenue to said content provider based on said data.

12. A non-transitory computer-readable medium having computer-readable program code embodied therein for causing a computer system to perform a method comprising:
accessing content from another computer system associated with a content provider;
storing said content in a memory of said computer system, wherein said computer system is associated with a service provider;
displaying, using said computer system, a first graphical user interface for enabling a user to select said content for purchase;
scanning said first computer system for updated content at regular intervals:
determining updated content by comparing a timestamp of a file of said content in said first computer system to a timestamp of a content file most recently moved from said first computer system to said second computer system;
overwriting said content stored in said memory of said second computer system when said updated content is determined: and
replacing said updated content in the first computer system with a dummy file, said dummy file having a file name that is the same as a file name of said updated content.

13. The non-transitory computer-readable medium of claim 12, wherein said storing further comprises storing said content in a protected area of said memory.

14. The non-transitory computer-readable medium of claim 12, wherein said method further comprises:
changing a file extension associated with said content.

15. The non-transitory computer-readable medium of claim 12, wherein said method further comprises:
providing a file to said another computer system, wherein said file includes a link to said content in said memory of said computer system.

16. The non-transitory computer-readable medium of claim 12, wherein said content is selected from a group consisting of at least one image, at least one music file, software, at least one moving picture, text information, technical advice, at least one address, medical information, legal information, and lifestyle information.

17. The non-transitory computer-readable medium of claim 12, wherein said method further comprises:
assigning authentication information to said content provider to enable transfer of said content from said another computer system to said computer system.

18. The non-transitory computer-readable medium of claim 12, wherein said method further comprises:
analyzing a website associated with said content provider to automatically identify a plurality of content files, wherein said plurality of content files includes said content.

19. The non-transitory computer-readable medium of claim 18, wherein said method further comprises:
displaying a listing of said plurality of content files using a second graphical user interface, and
wherein said accessing said content further comprises accessing said content responsive to a selection of said content by said content provider using said second graphical user interface.

20. The non-transitory computer-readable medium of claim 12, wherein said method further comprises:
accessing information associated with said content from said content provider, wherein said information is selected from a group consisting of a price of said content, a time period associated with a sale of said content, and a description of said content.

21. The non-transitory computer-readable medium of claim 20, wherein said information is selected from a group consisting of data entered into a graphical user interface, a table, and a text document.

22. The non-transitory computer-readable medium of claim 12, wherein said method further comprises:
storing data associated with said purchase of said content; and
distributing revenue to said content provider based on said data.

23. A system comprising a processor and a memory, wherein said memory comprises instructions that when executed by said system implement a method comprising:
accessing content from another system associated with a content provider;
storing said content in said memory, wherein said system is associated with a service provider;
displaying, using said system, a first graphical user interface for enabling a user to select said content for purchase;
scanning said first computer system for updated content at regular intervals;
determining updated content by comparing a timestamp of a file of said content in said first computer system to a timestamp of a content file most recently moved from said first computer system to said second computer system;
overwriting said content stored in said memory of said second computer system when said updated content is determined; and
replacing said updated content in the first computer system with a dummy file, said dummy file having a file name that is the same as a file name of said updated content.

24. The system of claim 23, wherein said storing further comprises storing said content in a protected area of said memory.

25. The system of claim 23, wherein said method further comprises:
changing a file extension associated with said content.

26. The system of claim 23, wherein said method further comprises:
providing a file to said another system, wherein said file includes a link to said content in said memory of said system.

27. The system of claim 23, wherein said content is selected from a group consisting of at least one image, at least one music file, software, at least one moving picture, text information, technical advice, at least one address, medical information, legal information, and lifestyle information.

28. The system of claim 23, wherein said method further comprises:

assigning authentication information to said content provider to enable transfer of said content from said another system to said system.

29. The system of claim 23, wherein said method further comprises:

analyzing a website associated with said content provider to automatically identify a plurality of content files, wherein said plurality of content files includes said content.

30. The system of claim 29, wherein said method further comprises:

displaying a listing of said plurality of content files using a second graphical user interface, and wherein said accessing said content further comprises accessing said content responsive to a selection of said content by said content provider using said second graphical user interface.

31. The system of claim 23, wherein said method further comprises:

accessing information associated with said content from said content provider, wherein said information is selected from a group consisting of a price of said content, a time period associated with a sale of said content, and a description of said content.

32. The system of claim 31, wherein said information is selected from a group consisting of data entered into a graphical user interface, a table, and a text document.

33. The system of claim 23, wherein said method further comprises:

storing data associated with said purchase of said content; and distributing revenue to said content provider based on said data.

34. The method of claim 1, further comprising checking said content for a file which has been changed that exceeds a file size threshold.

35. The method of claim 34, wherein said checking said content comprises preventing further action when a file exceeding said file size threshold is determined.

36. The method of claim 34, wherein said checking said content comprises generating an error report when a file exceeding said file size threshold is determined.

37. The method of claim 2, wherein said service provider has read and write access to content in said protected area.

38. The method of claim 2, wherein said user has read access to content in said protected area and does not have write access to content in said protected area.

39. The method of claim 2, wherein said accessing further comprises:

checking said content to determine a presence of a plurality of files in said content with a same file name and different extensions;

preventing further action when said presence is detected; and generating an error report based on said presence.

40. The method of claim 2, further comprising:

responsive to a purchase of said content using a payment system, sending a link to a user for enabling said user to access said content from said second computer system, wherein said link is provided by said payment system, and wherein said payment system has administrative rights over said memory of said second computer system.

* * * * *